July 30, 1935.    A. B. RYPINSKI    2,009,787
ARC WELDING APPARATUS
Filed Nov. 24, 1933
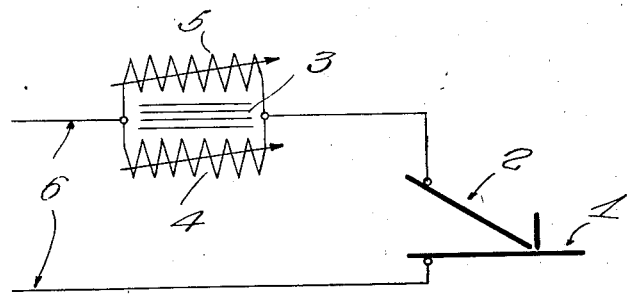
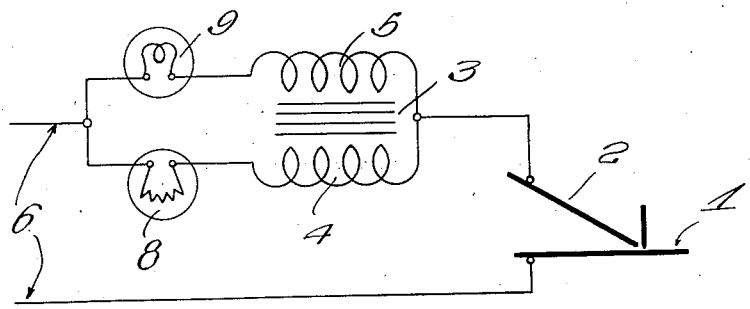
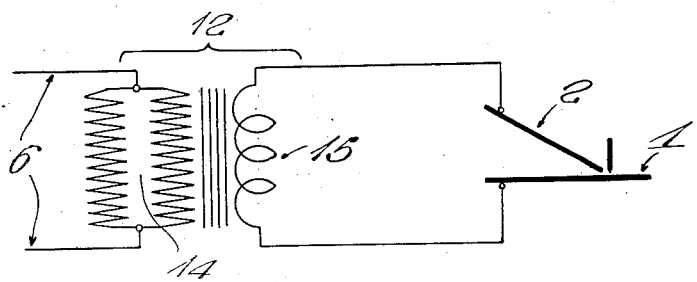
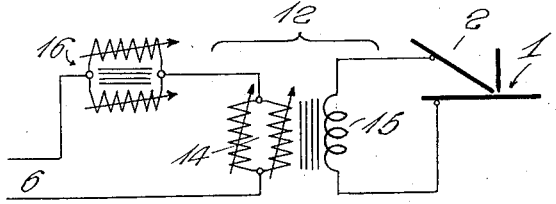
INVENTOR.
Albert B. Rypinski,
BY John B. Brady
ATTORNEY.

Patented July 30, 1935

2,009,787

UNITED STATES PATENT OFFICE 2,009,787

ARC WELDING APPARATUS

Albert B. Rypinski, Laurelton, Long Island, N. Y.

Application November 24, 1933, Serial No. 699,620

19 Claims. (Cl. 219—8)

My invention relates broadly to slow electromagnets and more particularly to an arc welding system employing slow reactors, slow impedors, or slow transformers as stabilizing means in the circuit thereof.

This application is a continuation-in-part of my application, Serial No. 416,877, filed December 27, 1929, for Slow electromagnet.

One of the objects of my invention is to produce a slow reactor for arc welding apparatus which will produce a change in inductive reactance not in proportion to the current in the arc but influenced thereby.

Another object of my invention is to produce an arc welding apparatus employing an impedor wherein the resistance and inductive reactance can be varied by the designer to become effective over a time period.

A further object of my invention is to produce an arc welding apparatus employing an impedor for stabilizing an alternating current arc by means of changes in resistance, or inductive reactance, or both, over a time period.

Other and further objects of my invention reside in the arc welding systems more fully described in the following specification by reference to the accompanying drawing, in which:

Figure 1 is a schematic diagram of the arc welding apparatus of my invention; Fig. 2 is a schematic diagram of a modification of the apparatus of my invention; Fig. 3 is a schematic diagram showing the slow impedance device of my invention employed as the primary of a slow transformer; and Fig. 4 is a modification of the diagram of Fig. 3, employing a slow impedance device in the primary circuit of the transformer.

It is known that the electric arc as used in welding is unstable, due to complex phenomena, principally in that the voltage across the arc decreases with increasing current, and vice versa, tending to build the current up cumulatively with increasing current and to reduce it in the same way. In other words, if there are no stabilizing devices in the circuit and the current begins to rise for any reason, the voltage across the arc will decrease, and the current will rapidly build up toward short circuit proportions. On the other hand, if the current begins to fall for any reason, the voltage across the arc will increase and the current will rapidly decrease until insufficient to maintain the arc. A resistance is ordinarily used in direct current systems, and a reactor, or a resistor and a reactor in alternating current systems, to stabilize the arc by absorbing the extra voltage on rising currents and releasing it on falling currents. The disadvantages are that the resistance wastes power, and the reactor lowers the power factor.

The slow impedors employed in the apparatus of my invention comprise a pair of windings formed of materials of different temperature coefficients of resistance. The windings are magnetically coupled in opposition and connected in parallel. On being subjected to change in temperature as would be caused by passage of current, the current division in the two parallel paths will be altered, and a magnetic flux proportional to the differential current set up. Thus, the effective inductance and resistance are variable with the temperature of the windings and, therefore, with the current.

The use of the slow impedor of my invention enables the designer to take advantage of its peculiar properties to obtain results which are not possible with resistors and the instantaneous type of reactors. Resistors as ordinarily built, give a voltage drop, IR, and watt loss I²R, proportional to the current. Reactors of the usual type give a voltage drop, IX, which rises with the current up to the saturation point of the iron core.

The slow impedors of my invention may have a relatively low resistance and low inductive reactance at one current and a considerably higher resistance and inductive reactance at a higher current value, due to rapid heating and consequent magnetic unbalance of the windings. In other words, the voltage drop across the impedor may be largely increased for a relatively small increase in current and with a minimum lowering of power factor, due to the fact that the resistance rises as well as the inductive reactance. The lowered resistance at lower currents reduces the losses, while the rapid rise in inductive reactance and resistance with rise in current makes for good regulation without sacrificing power factor.

If one winding is made to have a negative temperature coefficient of resistance while the other has a zero temperature coefficient of resistance, the total resistance of the reactor will decrease with increase in current. The magnetism may be zero at low current and be made to increase greatly as the current is increased. In that case, the resistance will decrease with increased current, but the inductive reactance will increase. If the latter effect is much greater than the former, the impedance voltage across the reactor will increase with current, but the power factor will decrease.

Other combinations could be set forth here, but the two given will serve to indicate the means. The resistance may be increased or decreased with current increases, while the inductive reactance rises or falls. Or the total resistance may be held constant with increase in current by using positive temperature coefficient of resistance material in one winding and negative temperature coefficient of resistance material in the other, while the inductive reactance increases.

It will, thus be seen that a large field for the designer's skill is opened by the use of my invention in arc welding systems, to produce results different from and superior to those possible with resistors and reactors as now employed.

Referring to the drawing in detail, Fig. 1 is a schematic diagram of the arc welding system of my invention wherein reference character 1 designates the work to be welded, connected in series with an arc welding electrode 2 and a slow reactor 3, composed of windings 4 and 5 connected in parallel and coupled magnetically in opposition. The windings are formed of materials having different temperature coefficients of resistance and are designed to produce variations in reactance or resistance, or both, with variations in the current caused by fluctuations in the electric arc, in a relative manner dependent on the desired effect.

Fig. 2 is a modification of the arc welding system of Fig. 1. Variations in current in an arc welding circuit are very rapid, corresponding to variations in the heat produced in the arc stream. To control these variations may require a medium capable of resistance variation with temperature of approximately the same speed. Such a medium is represented in Fig. 2 by the tungsten and carbon filaments of the lamps 8 and 9, respectively. By operating a conductor, such as these filaments at current densities at which the temperature change is large for a given change in current, their temperature may be made to vary approximately as fast as the arc expands and contracts, and thus be fast enough to control it. I may either employ such mediums in the form of windings 4 and 5 on the reactor itself, as shown in Fig. 1, or I may employ them as devices shown at 8 and 9 in series with windings 4 and 5 in Fig. 2.

I may employ a reactor which is also a slow transformer as 12 in Fig. 3 where the primary or line side coil 14 is made up of two paralleled and opposed windings with a single winding secondary 15. When using the slow transformer type reactor, I may elect to have the windings themselves change in resistance with current or include separate devices in series with each winding as previously explained for reactors.

Using a slow transformer, it becomes feasible to supply a heavy current at low voltage to the arc while drawing a light current at higher voltage from the line, thus cutting down the current carrying capacity of the high temperature windings or devices.

Fig. 4 shows a modification of the transformer circuit disclosed in Fig. 3. The slow impedance device 16 is connected in series with the primary 14 of the transformer 12 and serves to limit the initial current supplied to the circuit by having its maximum reactance when cold and minimum reactance after a predetermined time period.

It is to be understood that the slow impedance 16 is not required in every case since the slow transformer embodies both slow reactor and transformer functions which may be sufficient in numerous instances. It is to be further understood that the slow reactor system of Fig. 2, employing external resistance elements, may be substituted for any of the slow windings shown in Figs. 1, 3 and 4.

If a slow reactor of my design is functioning to control the current flowing to a pair of arc welding electrodes and one winding is disconnected, the other winding becomes an instantaneous reactor of the usual type and will exhibit different inductive characteristics. I may elect to use switching means or automatic means not a part of this invention to accomplish this result of converting from a slow type reactor to an instantaneous type, or vice versa.

While I have described my invention in certain preferred embodiments, I desire that it be understood that modifications may be made and that no limitations are intended other than are imposed by the scope of the appended claims.

What I claim as new and desire to secure by Letters Patent of the United States is as follows:

1. An arc welding system comprising a circuit including a pair of arc electrodes, a power supply, and means composed of a pair of windings magnetically coupled in opposition, connected in parallel and formed of materials having different temperature coefficients of resistance, said means disposed between said electrodes and said power supply for maintaining a constant voltage across the arc.

2. An arc welding system comprising a circuit including a pair of arc electrodes, a power supply, and means composed of a pair of windings magnetically coupled in opposition, connected in parallel and constituted by elements having different temperature coefficients of resistance, said means disposed between said electrodes and said power supply for maintaining a constant voltage across the arc.

3. In an arc welding system, a pair of arc electrodes, a power supply circuit, connections between said power supply circuit and said arc electrodes, and a device disposed in series between said power supply circuit and said electrodes for controlling the current to said arc electrodes for stabilizing the arc therebetween, said device comprising two inductively coupled and opposed windings connected in parallel, the resistance of at least one winding varying with temperature for altering the ratio of the currents in the parallel paths and varying the resultant magnetism through the device for changing its inductive reactance and thereby controlling the current passing to the arc.

4. An arc welding system comprising an alternating current supply line, a series circuit including a pair of electrodes and a reactor connected to said supply line, said reactor comprising two inductively coupled and opposed windings connected in parallel one with respect to the other and formed of materials having different temperature coefficients of resistance, said reactor producing changes in magnetism and inductive reactance with temperature changes in the windings.

5. An arc welding system comprising a direct current supply line, a series circuit including a pair of electrodes and a reactor connected to said supply line, said reactor comprising two inductively coupled and opposed windings connected in parallel one with respect to the other and formed of materials having different temperature coefficients of resistance, said reactor producing changes in magnetism and inductive reactance with temperature changes in the windings.

6. An arc welding system comprising a power supply line, a series circuit including a pair of electrodes and a reactor connected to said supply line, said reactor comprising two inductively coupled and opposed windings supported on a core of magnetic material and connected in parallel one with respect to the other, said windings formed of materials having substantially different temperature coefficients of resistance.

7. An arc welding systems comprising a power supply line, a series circuit including a pair of electrodes and a reactor connected to said supply line, said reactor comprising two inductively coupled and opposed windings supported on a core of magnetic material and connected in parallel one with respect to the other, one of said windings formed of material having a positive tempertaure coefficient of resistance and the other of said windings formed of material having a negative temperature coefficient of resistance.

8. An arc welding system comprising a power supply line, a series circuit including a pair of electrodes and a reactor connected to said supply line, said reactor comprising two inductively coupled and opposed windings supported on a core of magnetic material and connected in parallel one with respect to the other, one of said windings formed of material having a positive temperature coefficient of resistance and the other of said windings formed of material having substantially zero temperature coefficient of resistance.

9. An arc welding system comprising a power supply line, a series circuit including a pair of electrodes and a reactor connected to said supply line, said reactor comprising two inductively coupled and opposed windings supported on a core of magnetic material and connected in parallel one with respect to the other, one of said windings formed of material having a negative temperature coefficient of resistance and the other of said windings formed of material having subs*antially zero temperature coefficient of resistance.

10. An arc welding system comprising a power supply circuit, a pair of arc electrodes, connections between said supply circuit and said electrodes, and a device disposed in series between said power supply circuit and said electrodes for controlling the current to said arc electrodes for stabilizing the arc therebetween, said device comprising two inductively coupled and opposed windings, each winding having a resistor connected in series therewith, the two groups each comprising a winding and a resistor, being connected in parallel one with respect to the other, said resistors being formed of materials having different temperature coefficients of resistance, said windings producing changes in magnetism and inductive reactance with temperature changes in said resistors.

11. An arc welding system comprising a power supply line, a series circuit including a pair of electrodes and a reactor connected to said supply line, said reactor comprising two inductively coupled and opposed windings supported on a core of magnetic material and connected in parallel one with respect to the other, said parallel windings being constituted by materials having substantially different temperature coefficients of resistance, the relation of said coefficients acting to decrease the inductive reactance of the reactor with increased temperature in the windings to a value which is sufficient to sustain the arc.

12. An arc welding system comprising a power supply line, a series circuit including a pair of electrodes and a reactor connected to said supply line, said reactor comprising two inductively coupled and opposed windings supported on a core of magnetic material and connected in parallel one with respect to the other, said parallels including materials having substantially different temperature coefficients of resistance, the relation of said coefficients acting to increase the inductive reactance of the reactor with increased temperature in the windings.

13. An arc welding system including a power supply circuit, a pair of arc electrodes, connections between said supply and said electrodes, and control means disposed in said connections comprising an impedance device and a transformer having primary and secondary windings, said impedance device being connected in series with said power supply and the primary of said transformer winding, said primary winding and said impedance device each being formed of two coils connected in parallel and magnetically opposed and means comprising individual elements of different temperature coefficients of resistance connected in series with each of said coils for altering the current division in the two paralleled coils and producing a corresponding change in magnetism with change in temperature of said elements.

14. An arc welding system including a power supply circuit, a pair of arc electrodes, connections between said supply and said electrodes, and control means disposed in said connections comprising an impedance device and a transformer having primary and secondary windings, said impedance device being connected in series with said power supply and the primary winding of said transformer, at least one of said transformer windings and said impedance device each being formed of two coils connected in parallel and magnetically opposed, and means comprising elements of different temperature coefficients of resistance for altering the current division in the two paralleled coils and producing a corresponding change in magnetism with change in temperature of said elements.

15. An arc welding system including a power supply circuit, a pair of arc electrodes, connections between said supply and said electrodes, and control means disposed in said connections comprising an impedance device and a transformer having primary and secondary windings, said impedance device being connected in series with said power supply and the primary winding of said transformer, both of said transformer windings and said impedance device each being formed of two coils connected in parallel and magnetically opposed, and means comprising elements of different temperature coefficients of resistance for altering the current division in the two paralleled coils and producing a corresponding change in magnetism with change in temperature of said elements.

16. An arc welding system comprising a power supply circuit, a pair of arc electrodes, connections between said supply circuit and said electrodes, and a device disposed between said power supply circuit and said electrodes for controlling the current to said arc, said device comprising a transformer with a primary winding and a secondary winding, at least one of said windings comprising two inductively coupled and opposed coils connected in parallel one with respect to the other, and means comprising elements of different temperature coefficients of resistance for altering the current division in the two paralleled coils and producing a corresponding change in magnetism with change in temperature of said elements.

17. An arc welding system comprising a power supply line, a series circuit including a pair of electrodes and a reactor connected to said supply line, said reactor comprising two inductively coupled and opposed windings supported on a core of magnetic material and connected in parallel one with respect to the other, said parallels including materials having substantially different temperature coefficients of resistance, the relation of said coefficients acting to hold the inductive reactance of the reactor substantially constant with increased temperature in the windings.

18. An arc welding system comprising a power supply line, a series circuit including a pair of electrodes and a reactor connected to said supply line, said reactor comprising two inductively coupled and opposed windings supported on a core of magnetic material and connected in parallel one with respect to the other, said parallels including materials having substantially different temperature coefficients of resistance, said coefficients proportioned to change the impedance of said windings while maintaining substantially constant power factor with changes in temperature in the windings.

19. An arc welding system comprising a power supply circuit, a pair of arc electrodes, connections between said supply circuit and said electrodes, and a device disposed between said power supply circuit and said electrodes for controlling the current to said arc, said device comprising a transformer with a primary winding and a secondary winding, at least one of said windings comprising two inductively coupled and opposed coils connected in parallel one with respect to the other, said coils formed of materials having substantially different temperature coefficients of resistance.

ALBERT B. RYPINSKI.